June 30, 1931.  S. LEONE  1,812,636
SAW FILING MACHINE
Filed Dec. 31, 1927   6 Sheets-Sheet 3
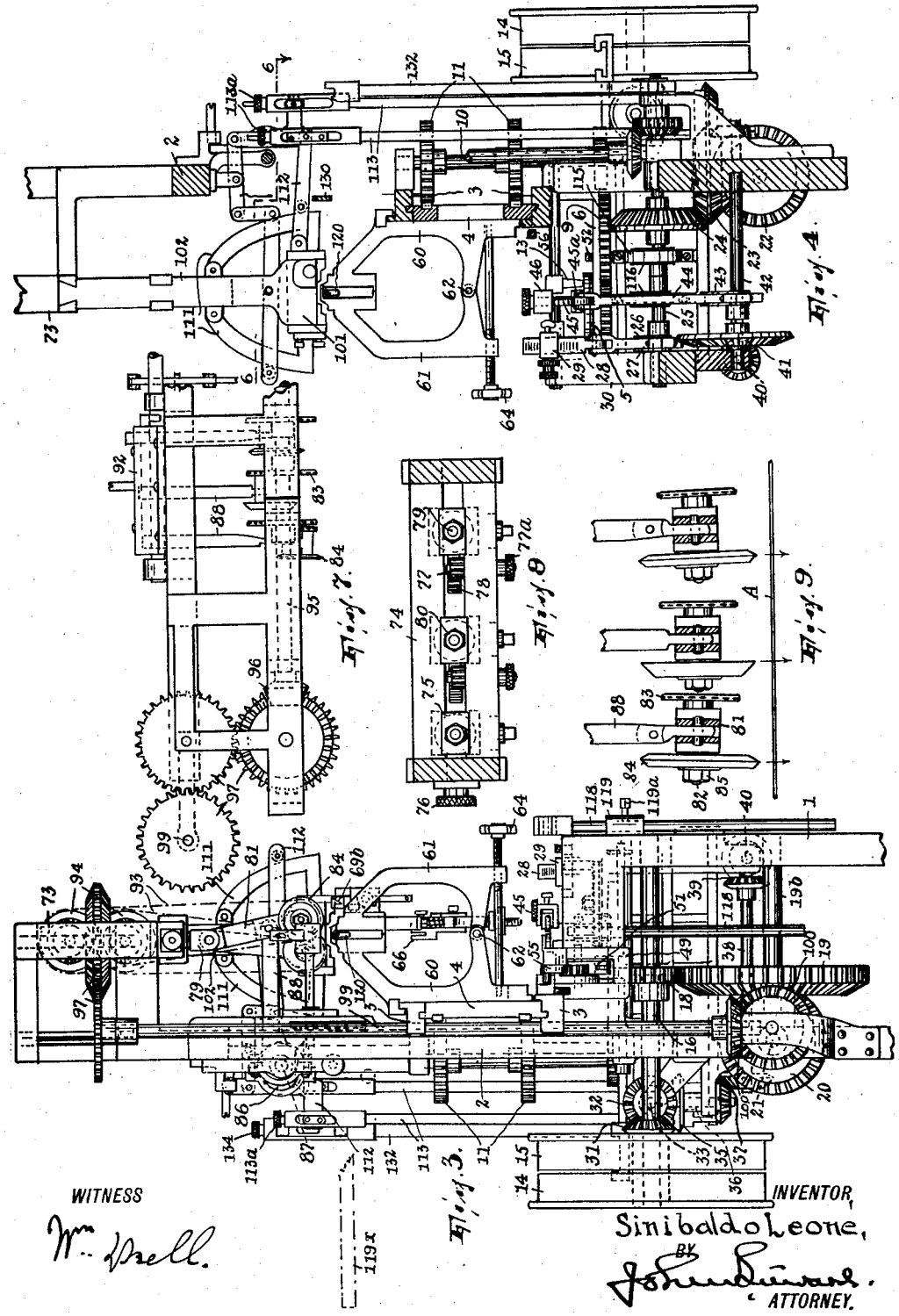

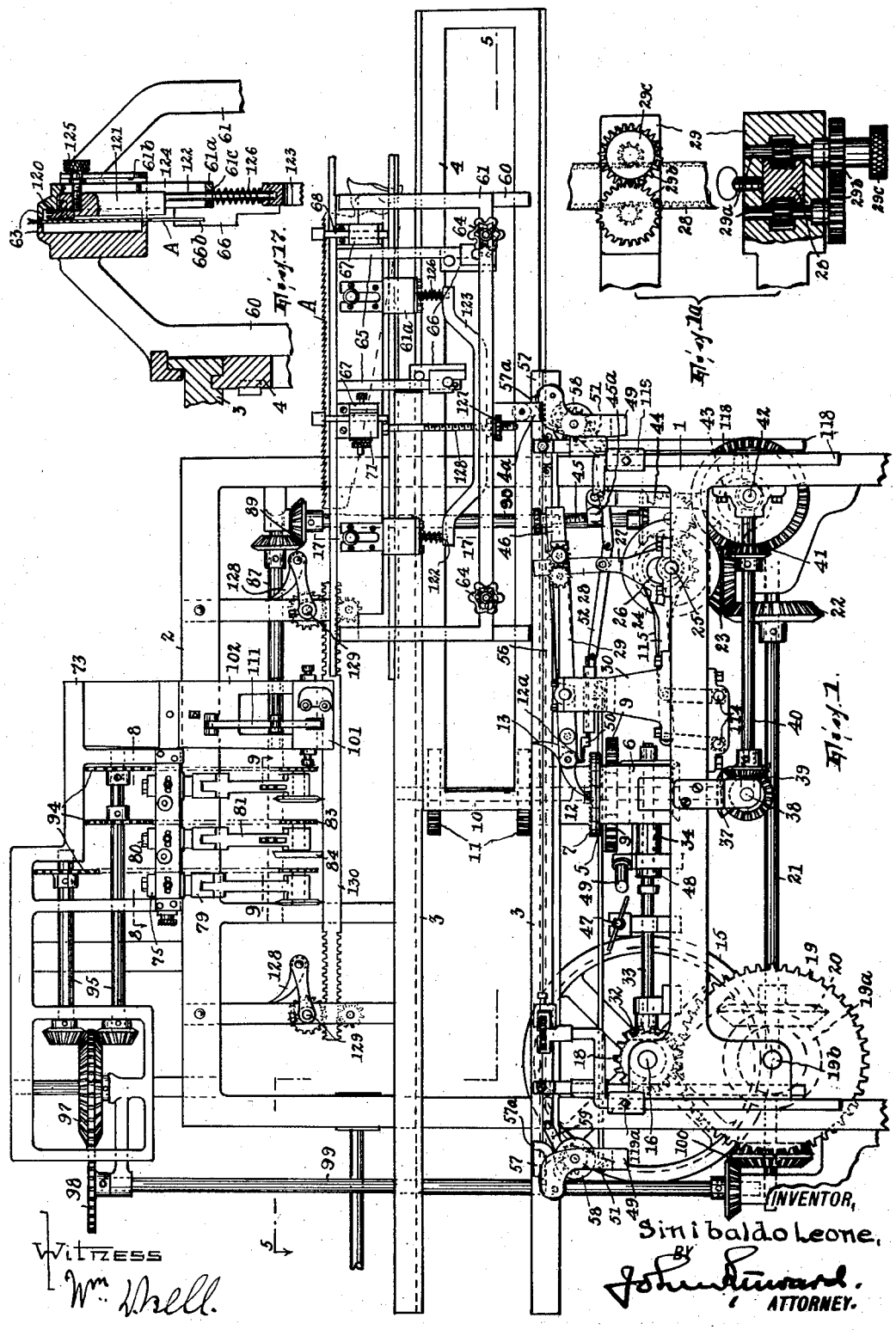

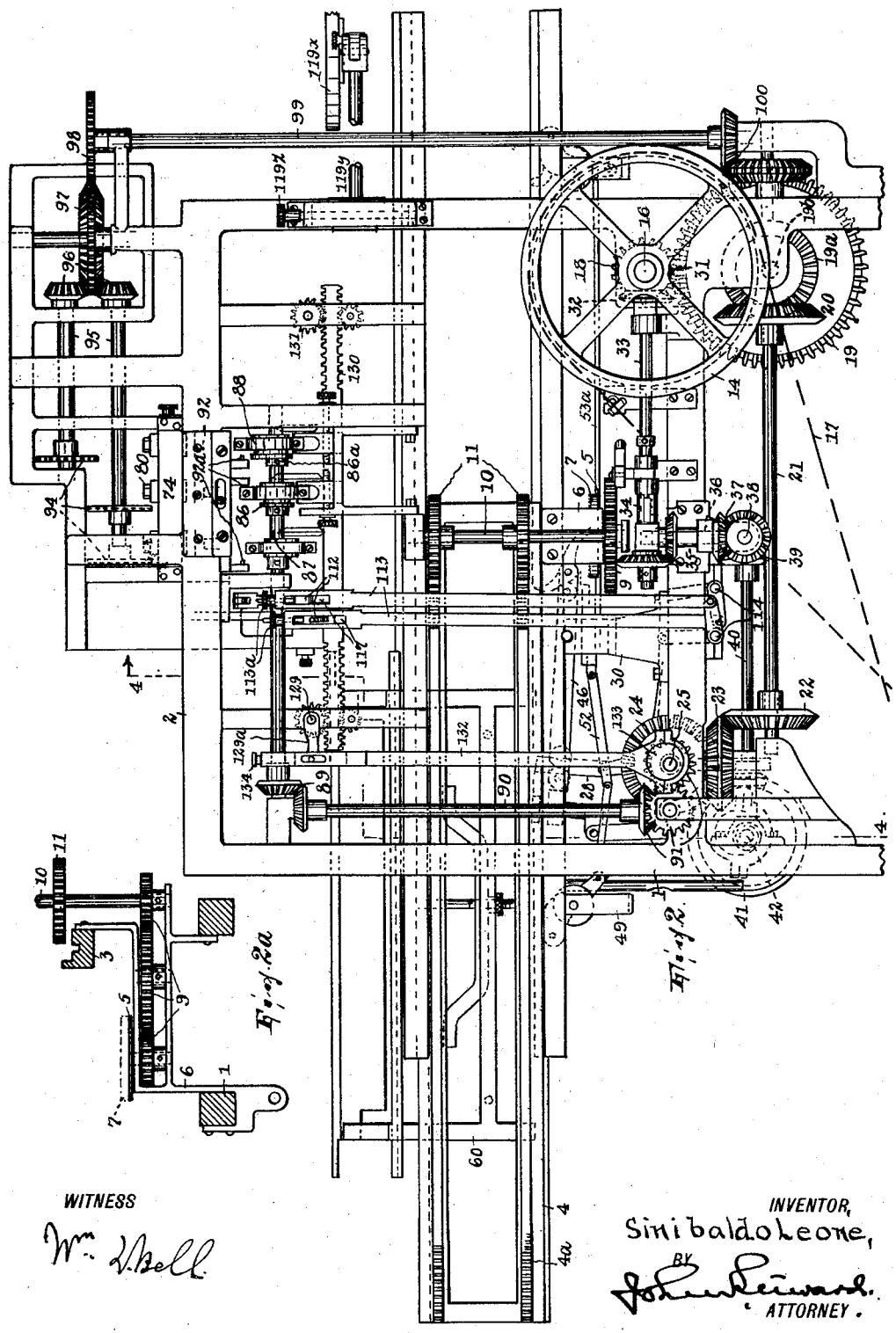

June 30, 1931. S. LEONE 1,812,636
SAW FILING MACHINE
Filed Dec. 31, 1927 6 Sheets-Sheet 4
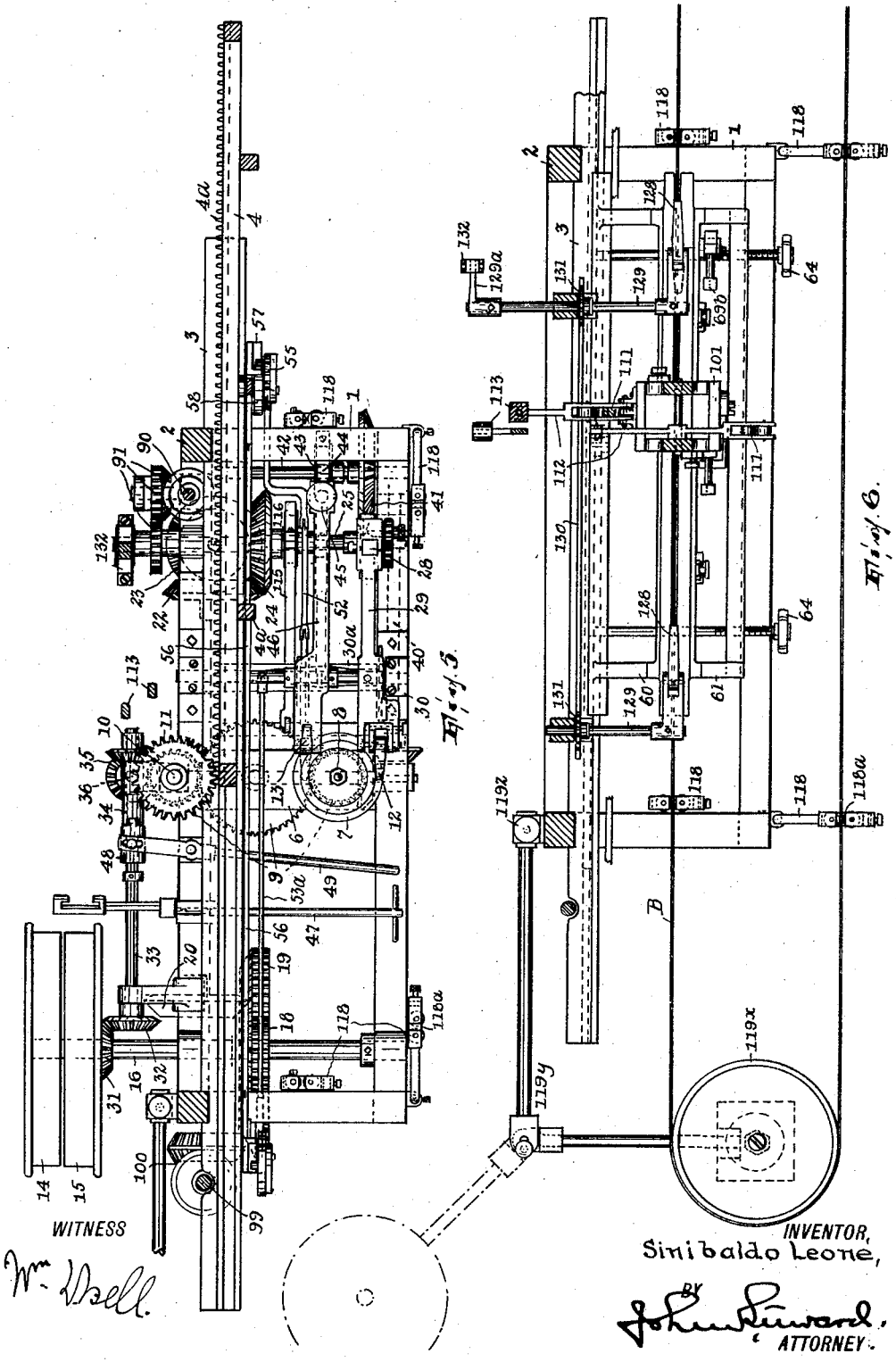
INVENTOR,
Sinibaldo Leone,
ATTORNEY.

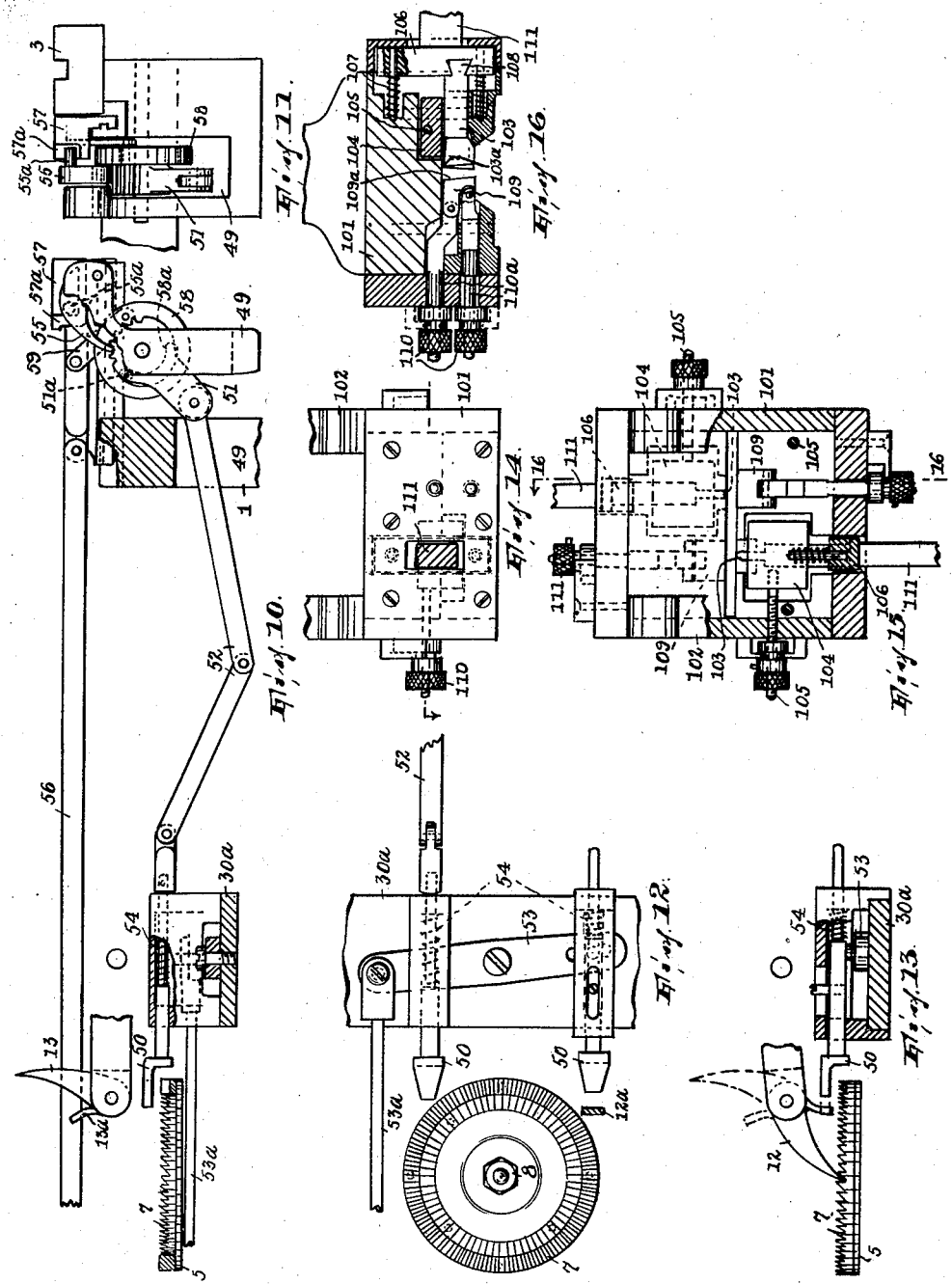

June 30, 1931.                S. LEONE                    1,812,636
                          SAW FILING MACHINE
                Filed Dec. 31, 1927      6 Sheets-Sheet 6
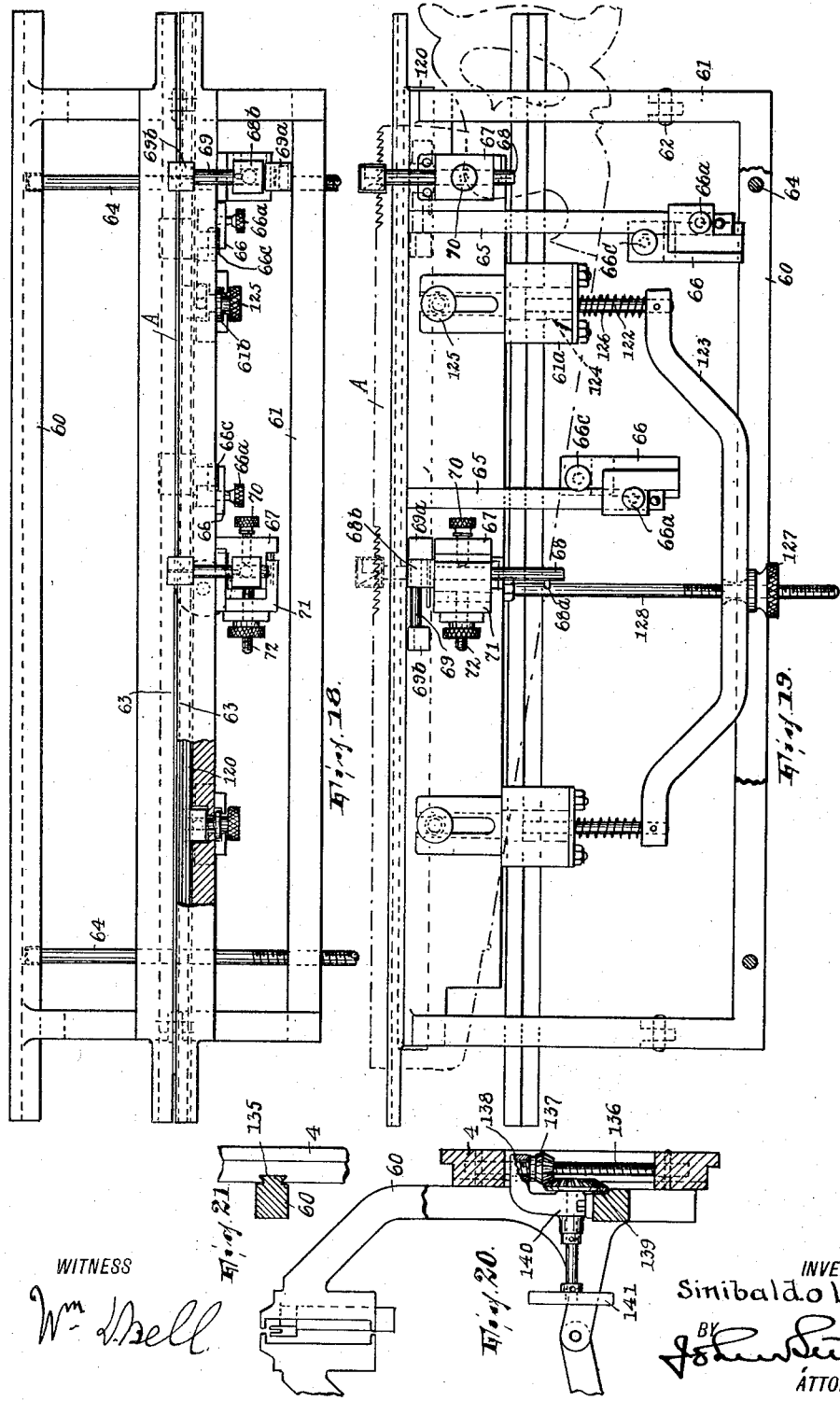

Patented June 30, 1931

1,812,636

UNITED STATES PATENT OFFICE

SINIBALDO LEONE, OF PATERSON, NEW JERSEY

SAW FILING MACHINE

Application filed December 31, 1927. Serial No. 243,842.

The object of this invention is to provide a reliable and efficient machine in which saws, whether of the flat type or band saws, and whatever the tooth-gage of the saw happens to be, may be automatically and accurately filed and set, or in the case of "dressing" the saw, simply filed, the operator having only to perform such simple operations as properly installing the saw in the machine, effecting certain adjustments according to the tooth-gage of the particular saw and starting the operations of the machine.

Fig. 1 is a front elevation of the machine, certain parts being omitted;

Fig. 1a is a side elevation and a horizontal section of a detail of the means for actuating the pawl 12;

Fig. 2 is a rear elevation of the machine, certain parts being omitted;

Fig. 2a is a side elevation of a part of the means for rotating the dial 7, with portions of the same in section;

Fig. 3 is a left-hand elevation thereof, certain parts being omitted;

Fig. 4 is a vertical section on line 4—4, Fig. 2;

Fig. 5 is a horizontal section on line 5—5, Fig. 1;

Fig. 6 is a horizontal section on line 6—6, Fig. 4;

Fig. 7 is a plan of the top portion of left-hand end of the machine;

Fig. 8 is a horizontal section on line 8—8, Fig. 1;

Fig. 9 is a horizontal section on line 9—9, Fig. 1;

Fig. 10 is a fragmentary front elevation of the mechanism for stopping the progress of the carriage;

Figs. 11 and 12 are, respectively, an end elevation and a plan of a part of what appears in Fig. 10, and Fig. 13 a vertical section thereof.

Fig. 14 is a front elevation, partly in section, of the setting means, Fig. 15 a plan thereof, partly in section, and Fig. 16 a section on line 16—16, Fig. 15;

Fig. 17 is a fragmentary section of the carriage on line 17—17, Fig. 1;

Fig. 18 is a plan and Fig. 19 a front elevation of the carriage; and

Figs. 20 and 21 are details showing a modification appertaining to the carriage.

A rectangular frame 1 has a rectangular upstanding back 2 and horizontal superposed guideways 3 for the carriage 4 supporting the vise or clamp for the saw. This carriage is advanced along the guideways step by step when a saw is being treated and is also returned step by step. The advance and return of the carriage are effected as follows: A disk 5 is journaled on a bracket 6 (Figs. 1, 2, 2a and 4) and is adapted to support a removable dial 7 clamped to the disk as by a nut 8 (Fig. 12); there will be several dials available, with their teeth variously spaced for treating saws of different tooth-gage. Gearing 9 connects this disk with a vertical shaft 10 (Figs. 2, 4 and 5) journaled in the frame and having a pair of gears 11 meshing with racks 4a on the back of the carriage. The teeth of the dial are in two concentric series, oppositely cut, and there are two pawls 12 and 13 for turning it respectively in the forward and rearward direction, the active stroke of each being to the left viewing the machine from the front and they respectively engaging the dial teeth forward and rearward of its axis (Fig. 5), one pawl being always thrown out of action when the other is operating. The working strokes of these pawls are obtained as follows, noting first that the actuation of pawl 12 is derived from the fast pulley 14 and that of pawl 13 from loose pulley 15 both on the shaft 16, which may be driven from any source by a belt 17 (Fig. 2) shiftable to either pulley: First, as to pawl 12: Shaft 16 has affixed thereto (Figs. 1 to 3) a pinion 18 in mesh with a gear 19 on shaft 19b (Figs. 1 to 3 and 5) with whose beveled teeth 19a (Fig. 2) engages a beveled pinion 20 on a horizontal shaft 21 at the back of the frame having a beveled gear 22 which meshes with a beveled gear 23 in turn meshing with a beveled gear 24 on a horizontal shaft 25 which has an eccentric 26 near the front of the machine embraced by an eccentric step 27 pivotally connected to what is in effect a depending arm 28 of a lever 29 fulcrumed in a bracket 30 on the frame 1, in which lever 29 the pawl 12 is pivoted so that when the lever is oscillated up and down through the just-described train of parts connecting it with the pulley 14 the pawl will pick the dial around clockwise (in plan) step by step so as to advance the carriage in the forward direction. Next, as to pawl 13: Pulley 15 has a bevel pinion 31 (Fig. 5) meshing with a bevel pinion 32 on a horizontal shaft 33 which may be clutched (as will be explained) with a clutch-sleeve 34 (Figs. 2 and 5), which through bevel gearing 35 drives a short vertical shaft 36 at the back, which through bevel gearing 37 drives a horizontal cross shaft 38 (Figs. 1 and 2), which through bevel gearing 39 (Figs. 1 and 3) drives a shaft 40 at the front of the machine, which through bevel gearing 41 drives a shaft 42 having an eccentric 43 whose eccentric strap 44 is pivotally connected to what is in effect an arm 45 of a lever 46 fulcrumed in bracket 30 (Figs. 1, 4 and 5) and having the pawl 13 pivoted thereto, so that when this lever is oscillated up and down through the just-described train of parts connecting it with pulley 15 the pawl will pick the dial around counter-clockwise (in plan) step by step so as to return the carriage. Briefly and by way of recapitulation tracing the forward and reverse drives (i. e., for the two shafts 25 and 42 which by their eccentrics actuate the pawl-carrying levers 29 and 46), the forward drive is from pulley 14 to shaft 21 at the back of the machine, then through gearing at the back to the shaft 25; and the reverse drive is from pulley 15, through horizontal shaft 33 and its clutch member 48—to be described— at the back of the machine, through vertical shaft 36 at the back, through cross-shaft 38 to the front, through horizontal shaft 40 at the front to shaft 42; in each system of parts thus outlined the pulley (14 or 15) is what I term the actuating member thereof.

47 (Figs. 1, 2 and 5) is a shifter for shifting the belt from one to the other of the fast and loose pulleys, i. e., transferring the power from one to the other of the two pawl-actuating systems. 48 (Figs. 2 and 5) is a clutch member slidable on shaft 33 into and out of engagement with the clutch sleeve 34 and 49 is its controlling lever. When the carriage is to be driven forwardly the shifter is moved to shift the belt to the fast pulley 14 and the clutch member 48 is disengaged from clutch sleeve 34 so that the pawl 12 will be actuated; when the carriage is to be returned the shifter is made to shift the belt to the pulley 15 and clutch member 48 engaged with clutch sleeve 34, so that the pawl 13 will be actuated. At the end of a forward and back movement of the carriage the driver (belt 17) is shifted from the fast to the loose actuating member (from pulley 14 to pulley 15) so that the saw already filed may be changed for another, and clutch 34—48 is present to permit stopping the action of pawl 13 at this time.

It will be understood that a dial 7 will be selected whose teeth are spaced to produce that increment of advance of the carriage which is proper according to the gage of the teeth of the particular saw being treated. (Incidentally, where the teeth of the dial are on a lateral face thereof rather than on its periphery, the pawl in its working stroke is not interfered with by the tooth next following the one it engages, as would be possible when the teeth are at the periphery of the dial.) The picking movements of the pawl 12 should correspond to the spacing of the particular dial teeth, and this is effected by adjusting each lever 29 and 46 with respect to its arm 28 and 45. As to the lever 29 (see Figs. 1a and 5) the arm 28 penetrates it and the lever has a pair of arbors 29a journaled therein and gearing into rack teeth on the arm 28 and provided with exterior intermeshing gearing 29b (Fig. 5) and one of them with a knob 29c so that upon turning the knob the arm will be adjusted vertically in the lever. As to lever 46 its arms 45 consists of a thumb screw (Figs. 1, 4 and 5) which is swiveled in the lever and screwed into a shackle 45a forming the part actually pivoted to the eccentric 44. The higher the pawl-carrying end of either lever, i. e., the pivot of the pawl, is thus adjusted, with the effect of allowing the acting end of the pawl to gravitate under its pivot, the greater will be the stroke of the pawl in the oscillation of the lever.

The forward speed of the carriage is the slower (that is to say, the return speed is the faster) because of a gearing-down at 18—19 in the driving train for pawl 12 not present in the driving train for pawl 13.

The carriage in its advance itself causes elevation of pawl 12, and in its return movement it causes elevation also of pawl 13, so that in each direction the carriage is automatically arrested. This is accomplished by two spring-actuated mechanisms adapted to be suddenly impelled by the power of their springs against the respective pawls and throw them up to the idle position, each of these being cocked at the end of one stroke of the carriage and tripped at the end of the other stroke. Supporting means for this purpose is afforded by the bridge portion 30a of the bracket 30 and two other brackets 49 arranged at each end of frame 1 (Fig. 1) and at the back of said frame just below the carriage (Fig. 3). Each such spring-actuated mechanism includes a plunger 50 slidable in a housing on said bridge portion 30a, a toothed lever 51 pivoted in one of the brackets 49 and a connection between the plunger and lever which in the one case is composed of links 52 and in the other of a lever 53 and a link 53a. Each such mechanism is normally urged to the left in Figs. 10 and 12 by a spiral spring 54 and is adapted to be cocked against the tension of such spring by a pawl 55 engaging the teeth of its lever 51. The carriage has a depending lug 4a which at the end of the stroke of the carriage in either direction engages and shifts a train of parts which on the one hand trips the pawl 55 of one spring-actuated mechanism and on the other hand turns the lever 51 of the other spring-actuated mechanism in the direction to cause the latter to be cocked by its pawl 55. This train includes a rod 56 having at each end a head or block 57 which slides on the bracket 49 and has an abutment 57a to be impinged by the lug 4a and to impinge a pin 55a on pawl 55; a disk 58 revoluble concentrically with the lever 51 and having an arcuate slot 58a receiving a pin 51a on the lever; and a link 59 connecting the rod 56 with the disk. When the carriage in moving to the right, say, (Fig. 10) encounters by its lug 4a the abutment 57a and moves the mentioned train to the right, it acts through the link 59 and disk 58 at the left in Fig. 1 to cock the spring-actuated mechanism having the relatively forward plunger 50 in Fig. 12 and then (by said abutment impinging pawl pin 55a) to trip the pawl 55 for the other or right-hand spring-actuated mechanism; and of course when the carriage in moving to the left encounters by its lug 4a the other abutment 57a these operations are repeated, the spring-actuated mechanism having the rearward plunger in Fig. 12 being cocked and the other mechanism being tripped. At the start of a setting and filing operation, the carriage being at the right, pawl 12 is down, engaged with the dial teeth and a heel 12a thereon is opposite the forward plunger in Fig. 12. When in the left hand or working stroke of the carriage this plunger is tripped it strikes said heel and throws the pawl to the elevated position (Fig. 13). The operator then shifts the belt from pulley 14 to pulley 15, engages clutch member 48 with the clutch sleeve 34 and depresses pawl 13 into engagement with the teeth of the dial. And at the end of the now ensuing right hand or idle stroke of the carriage this pawl has a heel 13a thereon struck by the rear plunger 50 and is thus automatically thrown up out of action (Fig. 10) in the way described. When the belt has been shifted back to pulley 14 and clutch member 48 has been declutched and pawl 12 re-engaged with the teeth of the dial the foregoing operations of the machine will be repeated.

The carriage carries a vise or clamp for the saw comprising a fixed frame 60 projecting therefrom and a movable frame 61 pivoted thereto on a horizontal axis at 62 (Figs. 1 to 3, 4, 6 and 17 to 19). Each of these frames has at the top a gripping jaw 63 extending the full length of the frame so as to present a long gripping surface to the saw blade, each jaw proper forming an overhang projecting toward the other as shown in Fig. 17. The movable jaw frame is moved on its pivot 62 toward or from the fixed jaw frame by two hand screws 64 (Figs. 1 to 3 and 6) which are tapped into the former and engage the latter frame at a point below the pivot 62. Depending from the top of the frame 61 (Figs. 17 to 19) are two spaced stems 65 on which are slidable vertically saw supporting blocks 66, each adapted to be secured to its stem at the proper elevation by a set screw 66a and having an upwardly open slot 66b (Fig. 17) to receive the back of the saw A, the slotted part of the block having a set screw 66c to bind against the back of the saw. The upper or tooth-edge of the saw must be level before the saw is finally clamped by the vise, and for this purpose there are gages which may be moved to gaging position over the saw but which normally are withdrawn from such position and hence clear of the filing and setting mechanism. These gages are suitably spaced from each other in the general position illustrated in Fig. 1 and are constructed as follows: Referring to Figs. 18 and 19, in blocks 67 (the right hand one of which is fixed to the front of the frame 61 and the left hand one adjustably supported as will be described) are slidable vertically two stems 68 each having a stop 68a to limit its upward movement and a head 68b, and in this head is horizontally slidable a stem 69 having a stop 69a at one end and a tapered head 69b (Fig. 3) to engage between the saw teeth and forming the gage proper at its other end. Each stem 68 may be elevated in the block and then turned to bring the gage proper over the tooth-edge of the saw A, in which position said stem may be clamped by a set screw 70 in the block. In fitting the saw to the vise and leveling it it is necessary that both gages proper should be entered to the full depth of the tooth spaces which happen to be opposite them, and where the number of teeth to the inch in this saw varies one gage should be capable of adjustment laterally with reference to the other. Hence the left hand block 67 is adjustable laterally in a block 71 fixed to the frame 61, 72 being screw means for effecting such adjustment. After the saw has been leveled by the gages the hand screws 64 may be clamped so that the saw is gripped by the vise at its toothed edge and then the blocks 66, receiving the back of the saw in their slots, are shifted upwardly and secured by their set screws 66a, thus backing the saw against the downward pressure of the filing means. There are other mechanisms shown in connection with the carriage which are employed when band saws are to be treated, but these will be described later.

The rectangular back 2 includes at the top a superstructure 73 which overhangs the carriage and in which operate the filing and setting mechanisms.

In a horizontal bridge 74 (Figs. 1 and 8) of such superstructure are adjustable lengthwise in a slot thereof three blocks 75, the adjustment for the left hand block being effected by a screw 76 and of each of the other two blocks by a pinion 77, having a thumb piece 77a, and a rack 78 projecting from the block. Each block is penetrated by a fork 79 capable of turning in the block and adapted to be clamped in any position to which it is turned by a nut 80. In each fork is pivoted a depending arm 81 (Fig. 9) in which is journaled a shaft 82 equipped with a sprocket wheel 83 and having a rotary file 84 removably secured thereon by a nut 85. As shown in Fig. 9, two of these three files have a double bevel and the third or middle one a single bevel. The arms 81 are reciprocated and the files simultaneously rotated as follows: The reciprocation of each file is obtained from an eccentric 86 on a horizontal shaft 87 (Figs. 1 to 3), journaled in the back 2, through an eccentric strap 88 pivotally connected to the file-carrying arm, each eccentric being releasably secured to said shaft by the set screw 86a for a purpose to appear. The said shaft is rotated through bevel gearing 89 (Fig. 2) from a vertical shaft 90 journaled in the back (2) and shaft 90 is rotated through gearing 91 (Figs. 2 and 5) from the shaft 25. (As will appear, when the first and third files are reciprocated the middle file is idle, and when the middle file is reciprocated the first and third files are idle. To cause such file or files to idle as to reciprocation the operator loosens the set screw 86a for the corresponding eccentric and then shifts a slide 92 (Fig. 2) so that appropriate ones of the three pins 92a thereon enter suitable holes in the eccentric strap or straps and consequently the corresponding file arm or arms stand stationary.) The rotation of the files is accomplished through sprocket chains 93 (Figs. 1 and 3) engaging their sprockets 83 and extending around other sprockets 94. For filing saws having successive teeth with their forward faces reversely oblique, as cross-cut saws, the first and third files must rotate in reverse direction, so the sprocket wheels 94 for these two files are mounted on separate horizontal shafts 95 on which may also be mounted the sprocket wheel for the middle file. These two shafts are driven in reverse directions by beveled gears 96 in mesh with a doubled beveled gear 97 which through gearing 98 (Figs. 1, 2 and 7) is connected with a vertical shaft 99 having connection through bevel gearing 100 with the gear 96.

The setting means is contained in a housing 101 at the lower end of a depending portion 102 of the superstructure 73 (Figs. 1 and 14 to 16.) Since in filing and setting the saw is usually advanced two teeth at a time, there are two setters and their respective anvils, and each setter is adjustable laterally (lengthwise of the saw) as well as movable toward its anvil; the two setters and two anvils are arranged so as to be on opposite sides of the saw so that one setter and anvil set one tooth one way and the other setter and anvil set another tooth the opposite way. Each setter 103 has a projection forming the setter proper and formed by beveling it in side elevation (Fig. 16) with a setting point 103a. It should be adjustable laterally (lengthwise of the saw) to adapt it to saws having varying tooth-gage, so it is contained (as well as slidable to and from the saw plane) in a block 104 laterally adjustable in the housing 101 by the adjusting screw 105. Its movement toward and from the saw plane is derived from a block 106 contained in said housing and normally acted on by springs 107 to retract the setter and adapted to be impelled toward said plane as will be explained, the setter being connected with said block by a dove-tailed joint 108 which permits the mentioned adjustment of the setter laterally. Each anvil 109 is a block having an acting face 109a opposed to the corresponding setter point 103a; it is adjustable pivotally to change the angularity of said face according to the degree of set required by turning one of the nuts 110 screwed onto the exterior ends of upper and lower stems 110a to which the anvil is pivoted. Opposite segmental plungers 111 (Figs. 1, 3, 4 and 14 to 16) are pivoted to part 102 of the superstructure and the curved cam surfaces of these are acted upon, to cause their lower ends (which project into housing 101) to push the blocks and hence the setters toward the anvils, by lever systems 112 which are connected with pitmen 113, in turn connected with the cranks of rock shafts 114 (Fig. 1) adapted to be rocked by eccentric straps 115 from eccentrics 116 (Figs. 1 and 4) on the shaft 25 (Figs. 2 and 4). Adjustment of either of the lever systems up or down with respect to its pitmen manifestly alters the extent of the stroke of the corresponding plunger 111 and consequently the corresponding setter and the extent of the set; such adjustment is accomplished by a screw means 113a on each pitman which when manipulated shifts the lever system up or down in a slot 117 (Fig. 4) in the pitman.

The foregoing sets forth all structure involving the filing and setting of flat saws, and as to such the general operation will now be described: In filing and setting, the saw is advanced increments each equal to two saw teeth, both files acting (on two different teeth) and both setters acting opposite to each other (on two different teeth). Whatever adjustment of the files and of the setters relatively to each other is necessary so as to suit the tooth gage of the particular saw being treated is accomplished, as to the files, by laterally adjusting their forks 78 (Fig. 8) and laterally adjusting the setters by means of their adjusting screws 105, as already described, and as explained a dial is chosen whose tooth-gage will suit the tooth gage of the saw to be treated and the levers 29 and 46 are adjusted with respect to their arms 28 and 45 so as to vary the stroke of the pawls 12 and 13.

Having clamped the saw in the vise or clamp, properly leveled, and having the carriage at the right and pawl 12 depressed into engagement with the dial, the machine is started with the belt on pulley 14. Thereupon as the carriage proceeds forward or to the left step by step each file while being rotated is shifted across the saw and back for each step of advance of the carriage while the pair of setters perform their setting strokes together, once for each such step of advance of the carriage. When the carriage has proceeded far enough for its lug 4a to do so, said lug shifts the rod 56 in the manner already explained and stops the progress of the carriage automatically by elevating pawl 12, the lever carrying such pawl continuing to oscillate because the forward drive remains operating as yet. The operator then depresses pawl 13, shifts the belt to pulley 15 and clutch member 48 into clutching engagement with clutch sleeve 34, thereby stopping the forward drive and the oscillation of lever 29 and starting the reverse drive and the oscillation of lever 46 so that that pawl by its engagement with the dial returns the carriage to the starting point.

Where any saw is to be filed the front face of each tooth of which is at right angles to the plane of the saw (as in rip or band saws) single beveled files (like the middle file in Fig. 9) are used and the file arms 81 are adjusted by turning their forks 79 in the bridge 74 so that the files rotate and oscillate in planes perpendicular to the plane of the saw; but where the front faces of the saw teeth are oblique, alternately right and left, as in cross-cut saws, double beveled files, like the end files in Fig. 9, are used and then the forks of these two files are adjusted so that the files rotate and oscillate in planes relatively reversely oblique to the plane of the saw.

Occasionally a saw will have its toothed edge so badly mutilated as to require "dressing", i. e., filing to such a depth as to obliterate all of the original teeth and form the teeth anew. In such a case the middle file in Fig. 9 alone is used, being a single beveled file, and the setting mechanism is rendered inactive, as by releasing the eccentrics 116 on shaft 25 so that no motion would be imparted to the setters. Of course, according as the first and third files in Fig. 9 or the middle file is operating the proper eccentrics 86 for those files are released from the shaft 87 and the block 92 shifted to render such eccentrics idle.

Band saws are treated the same as flat saws when they require "dressing", the saw being released and shifted along in the vise and reclamped each time the carriage completes its forward stroke. That is, they are clamped in the carriage and the carriage and filing and setting means operated the same as already described; the band saw may at this time be supported at the proper level by four guides 118 (Figs. 1, 3 and 6) which are vertical rods vertically adjustable and turnable in clips 119 on frame 1 (the front pair having their upper ends bent off) and formed with roller or other anti-friction jaws 118a to receive the band saw B when these guides are in operative or elevated position (Fig. 6), each clip having a set screw 119a to hold the rod. For keeping the band saw taut there may be a sheave 119x revoluble in a horizontal plane on an articulative bracket 119y adjustable vertically on the frame back 2 by any suitable means 119z. But when a band saw is merely to be filed and set the operator can keep these operations proceeding for the whole circuit of the saw without occasionally reversing the carriage (which then remains stationary while the saw alone is advanced step by step) by resort to the following mechanism—see Figs. 1, 17 to 19: A band saw guiding structure is arranged in the forward frame 61 of the clamp or vise and comprises a bar 120 (grooved at the top to receive the back of the saw), blocks 121 secured to this bar and depending therefrom, stems 122 depending from the blocks, and a bow 123 affixed to the lower ends of the stems. This structure is shiftable in frame 61 toward frame 60 (so that the bar, instead of being retracted under the overhanging jaw of frame 61, Fig. 17, will have the saw guiding groove of bar 120 directly under the space between the vise jaws), and for this purpose the blocks slide in slots 124 formed in the top bar of frame 61 and depending projections 61a thereof, being so moved by turning thumb-screws 125 swivelled in opposite grooves 61b in said top bar and tapped into the blocks; the projections 61a have holes 61c through which stems 122 extend and these are enlarged to allow such movement of said structure. Said structure also is movable upwardly to level the saw, being normally held depressed by springs 126, its bow 123 for this purpose resting on a nut 127 screwed onto a stem 128 depending from top bar of frame 61. For advancing the band-saw, which then travels between the not too tightly closed jaws of the vise and in the groove of bar 120, two pawls 128 (Fig. 1) are utilized. These are pivoted in cranks on rock-shafts 129 made to oscillate together through a suitably guided horizontal rack 130, whose teeth mesh with pinions 131 on the rock-shafts and which is horizontally movable, one of such rock-shafts having an arm 129a (Fig. 2) to which is pivotally connected a pitman 132 having an eccentric strap embracing an eccentric 133 on the shaft 25 forming part of the mentioned forward drive means. Adjustment, to change the stroke of the pawls to suit different saw tooth-gages, may be effected by the screw means 134 (Fig. 2) whose manipulation shifts the arms 129a up or down relatively to the pitmen, turning the rock-shafts one way or the other so that the acting ends of the pawls will come more or less under the rock-shafts. Of course, in this operation only the forward drive is in motion.

In order that the saw (especially in the case of a band saw) may be conveniently entered into the vise the latter may be adapted to slide downward on the carriage, being connected therewith by vertical tongue-and-groove connections 135 (Figs. 20 and 21). Such movement may be effected, for example, by providing fixed screws as 136 in the carriage, nuts as 137 on these screws arranged to assume by ears 138 on the frame 61 of the vise the weight of the latter, and bevel gears as 139 meshing with beveled teeth on the nuts and journaled in brackets 140 on the vise frame 61 and having handles 141 for turning the gears.

Having thus fully described my invention, what I claim is:

1. A machine for performing operations successively on the teeth of a saw comprising a frame, a saw-holding carriage slidable therein back and forth, reciprocatory means to operate on the saw, means to slide the carriage in one direction and simultaneously reciprocate the reciprocatory means including a rotary actuating member, means, also including a rotary actuating member, to slide the carriage in the opposite direction while the reciprocatory means is at standstill, and driving means shiftable into driving engagement with one or the other of said members.

2. A machine for performing operations successively on the teeth of a saw comprising a frame, a saw-holding carriage slidable therein back and forth, reciprocatory means to operate on the saw, rotary means geared with the carriage, means to rotate said rotary means step by step in one direction and while it is rotating in said direction simultaneously reciprocate the reciprocatory means, and means, operative independently of said reciprocatory means, to thereupon rotate the rotary means step by step in the other direction while said reciprocatory means is at standstill.

3. In a machine for performing operations successively on the teeth of a saw, the combination of a frame, a movable system including a sliding saw-holding carriage, a reciprocating pawl adapted to engage and move said system step by step, means to reciprocate the pawl, said pawl being shiftable clear of said system, and means, controlled by said system, for shifting said pawl clear of said system when the latter has travelled a predetermined distance.

4. In a machine for performing operations successively on the teeth of a saw, the combination of a frame, a back-and-forth movable system therein including a slidable saw-holding carriage, reciprocating pawls one of which is adapted to engage and move said system step by step in one direction and the other of which is adapted to engage and move said system in the opposite direction step by step, means to reciprocate said pawls, said pawls being shiftable therein clear of said system, and means, controlled by said system, for shifting one pawl clear of said system when the latter has travelled a predetermined distance in one direction and for shifting the other pawl clear of said system when the latter has travelled a predetermined distance in the opposite direction.

5. A machine for performing operations successively on the teeth of a saw comprising a frame, a movable system including a sliding saw-holding carriage and rotary means geared therewith, reciprocatory means to operate on the saw, and separate drives for said rotary means, one being operatively connected with and adapted to reciprocate said reciprocatory means and to rotate said rotary means in one direction and the other being adapted to rotate said rotary means in the opposite direction while the reciprocatory means is at standstill.

6. The combination of a frame, means to hold the saw being filed, a file-holding member movable back and forth through the plane of the saw, and a support for said member in which the latter is so movable, said support being rotatively adjustable in the frame on an axis crossing the path of movement of said member.

7. The combination of a frame, means to hold the saw being filed, a file-holding member movable back and forth through the plane of the saw, and a support for said member in which the latter is so movable, said support being rotatively adjustable in the frame on an axis substantially coinciding with the plane of the saw.

8. The combination of a supporting structure, means to hold the saw being filed, a rotary driving member arranged opposite and spaced from the edge of the saw to be filed, a file-holding element also arranged opposite and spaced from the edge of said saw and movable in a direction through the plane thereof, a rotary-file including member journaled in said element, and a driving connection connecting said members, said element being rotatively adjustable in said structure on an axis crossing its path of movement.

9. The combination of supporting means, means to hold the saw being treated in an upright plane, a plurality of pivoted tool-holders movable on their pivots through said plane and one being pivoted in the first-mentioned means, and a supporting member in which the other tool-holder is pivoted adjustable lengthwise of the saw toward and from the first tool-holder.

10. The combination of a supporting means, means to hold the saw being treated, a tool-holder movable in the supporting means, a rotary driving member for the holder, an eccentric releasably secured on said member, an eccentric strap connecting the eccentric and holder, and means to hold the strap stationary when the eccentric is released from said member.

11. The combination of supporting means, means to hold the saw being treated, a pair of file holders, a rotary file including member journaled in each holder with the file in a plane intersecting the plane of the saw, each holder being adjustable in said supporting means to alter the angularity of the corresponding file with reference to the plane of the saw, and reversely rotating means respectively driving said members.

12. A machine for performing operations successively on the teeth of a saw comprising a frame, a saw-holding carriage slidable therein back and forth, reciprocating means to operate on the saw, means to slide the carriage in one direction and simultaneously reciprocate the first means including a rotary actuating member, means to slide the carriage in the opposite direction also including a rotary actuating member having a disconnective clutch-connection, and driving means shiftable into driving engagement with one or the other of said members.

13. A machine for performing operations successively on the teeth of a saw comprising a frame, a movable system including a sliding saw-holding carriage and rotary means geared therewith, reciprocatory means to operate on the saw, and separate drives for said rotary means, one being operatively connected with and adapted to reciprocate said reciprocatory means and to rotate said rotary means in one direction and the other being adapted to rotate said rotary means in the opposite direction while the reciprocatory means is at standstill and each including a reciprocating pawl engageable with and adapted to move said rotary means and each being movable independently of the other clear of said rotary means.

In testimony whereof I affix my signature.

SINIBALDO LEONE.